(12) United States Patent
Lerch et al.

(10) Patent No.: US 9,407,331 B2
(45) Date of Patent: Aug. 2, 2016

(54) NFC DEVICE WITH CONFIGURABLE NOTIFICATIONS

(71) Applicant: INSIDE SECURE, Meyreuil (FR)

(72) Inventors: Matthias Lerch, Septemes les Vallons (FR); Remy Ferroul, Trets (FR)

(73) Assignee: Inside Secure, Meyreuil (FR)

( * ) Notice: Subject to any disclaimer, the term of this patent is extended or adjusted under 35 U.S.C. 154(b) by 0 days.

(21) Appl. No.: 14/436,120

(22) PCT Filed: Nov. 14, 2013

(86) PCT No.: PCT/FR2013/052742
§ 371 (c)(1),
(2) Date: Apr. 16, 2015

(87) PCT Pub. No.: WO2014/076427
PCT Pub. Date: May 22, 2014

(65) Prior Publication Data
US 2015/0280787 A1    Oct. 1, 2015

(30) Foreign Application Priority Data

Nov. 14, 2012  (FR) ...................................... 12 60850

(51) Int. Cl.
*H04B 5/00*    (2006.01)
*H04W 4/00*    (2009.01)

(52) U.S. Cl.
CPC ............. *H04B 5/0031* (2013.01); *H04W 4/008* (2013.01)

(58) Field of Classification Search
CPC . H04M 2250/04; H04W 12/08; H04W 4/008; G06Q 20/341
USPC ......................................................... 455/41.1
See application file for complete search history.

(56) References Cited

U.S. PATENT DOCUMENTS

| | | | |
|---|---|---|---|
| 8,744,347 B2* | 6/2014 | Charrat ................ | G06Q 20/341 455/41.1 |
| 2009/0247077 A1 | 10/2009 | Sklovsky et al. | |
| 2010/0227553 A1 | 9/2010 | Charrat et al. | |
| 2011/0010755 A1 | 1/2011 | Virtanen | |

OTHER PUBLICATIONS

Jan. 16, 2014 Search Report issued in International Application No. PCT/FR2013/052742.

* cited by examiner

*Primary Examiner* — Eugene Yun

(57) ABSTRACT

The present invention relates to a near field communication device configured to establish a near field communication channel with an external device, and provide a first host processor with application data sent by the external device. The device is configured to provide a second host processor with notifications relating to the nature or content of application data provided to the first host processor, and configure the notifications according to a characteristic parameter of an application in the framework of which the external device sends data to the first host processor.

20 Claims, 5 Drawing Sheets

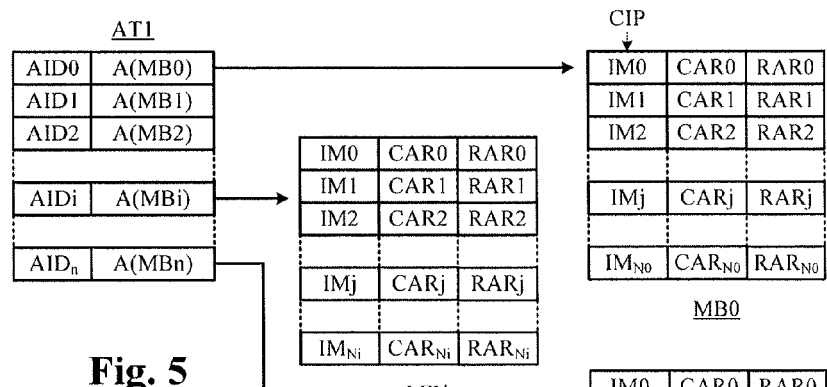
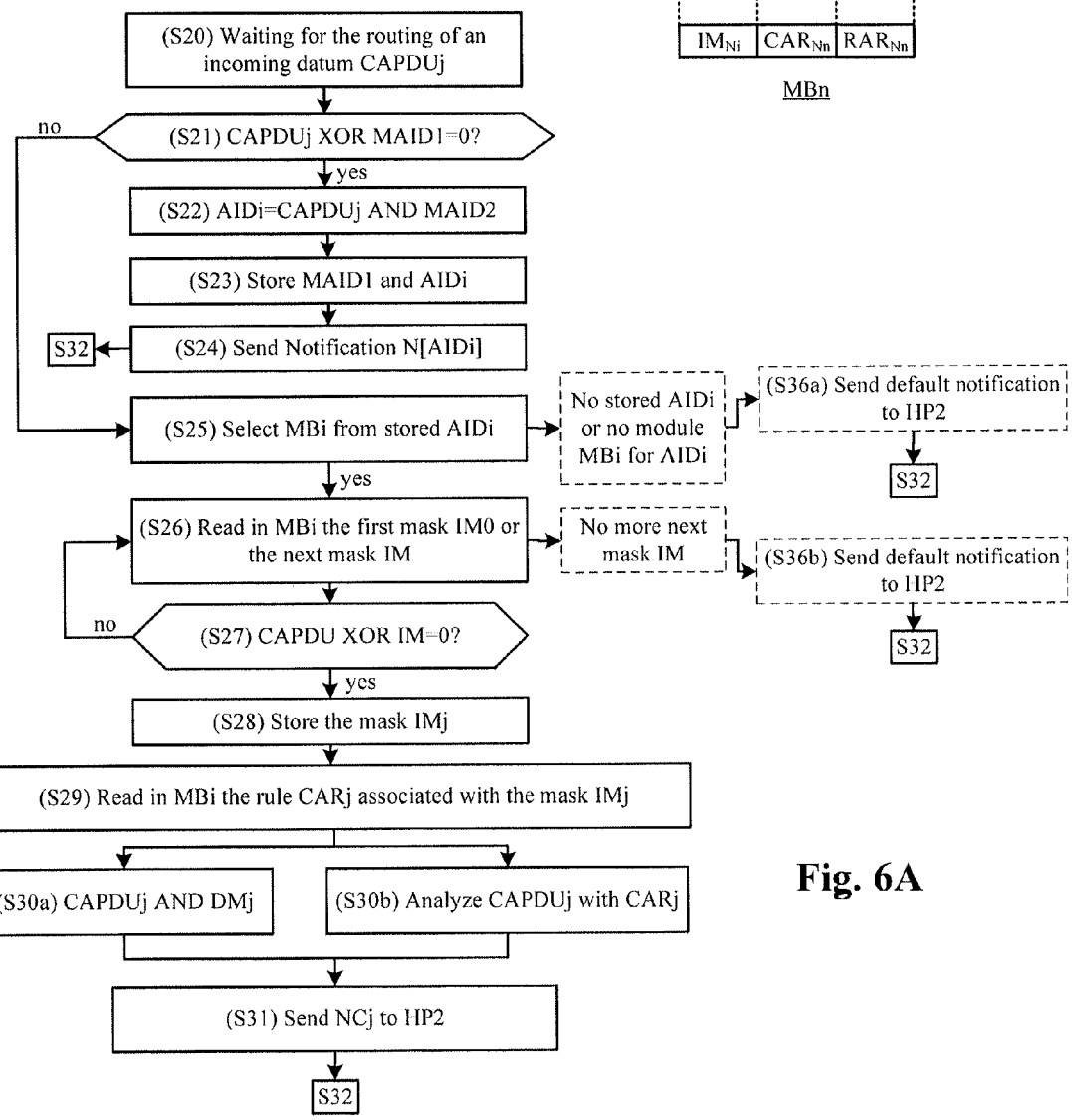
Fig. 5
Fig. 6A

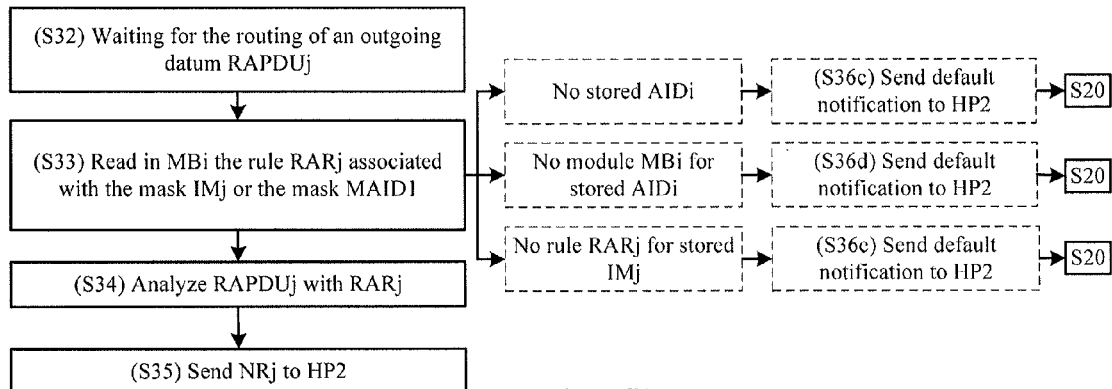
Fig. 6B
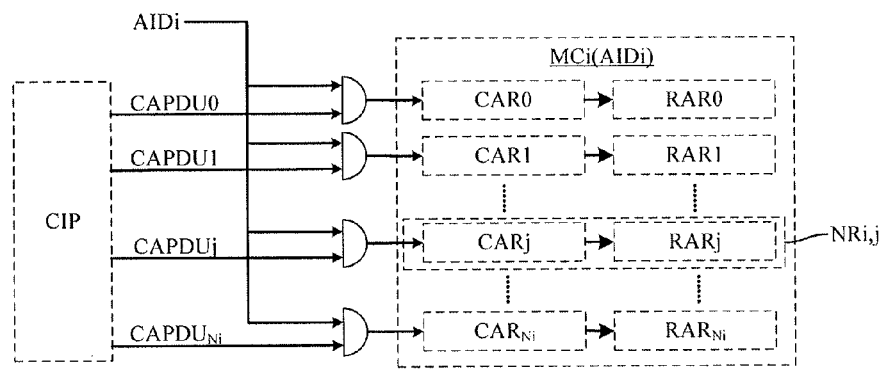
Fig. 7
Fig. 8

RNT

| AID | PROT | TECH | BAT | TargProc1 | TargProc2 | MB |
|---|---|---|---|---|---|---|
| AID0 | - | - | ON | HP1 | HP2 | A(MB0) |
| - | PROT0 | - | ON | HP1 | HP2 | A(MB0) |
| - | - | TECH2 | ON | HP1 | HP2 | A(MB0) |
| AID0 | - | - | LOW | HP1 | HP2 | A(MB1) |
| - | PROT0 | - | LOW | - | HP2 | A(MB1) |
| - | - | TECH2 | LOW | - | HP2 | A(MB1) |
| AID0 | - | - | OFF | HP1 | - | - |
| - | PROT0 | - | OFF | HP1 | - | - |
| - | - | TECH2 | OFF | HP1 | - | - |
| AID1 | - | - | ON | HP2 | HP1 | A(MB2) |
| - | PROT2 | - | ON | HP2 | HP1 | A(MB2) |
| - | - | TECH1 | ON | HP2 | HP1 | A(MB2) |
| AID1 | - | - | LOW | HP2 | HP1 | A(MB2) |
| - | PROT2 | - | LOW | HP2 | HP1 | A(MB2) |
| - | - | TECH1 | LOW | HP2 | HP1 | A(MB2) |
| AID1 | - | - | OFF | HP1 | HP3 | - |
| - | PROT2 | - | OFF | HP1 | HP3 | - |
| - | - | TECH1 | OFF | HP1 | HP3 | - |
| ⋮ | | | | | | |
| AIDn | - | - | ON | HP1 | HP2 | A(MBn) |
| - | PROT4 | - | ON | HP1 | HP2 | A(MBn) |
| - | - | TECH2 | ON | HP1 | HP2 | A(MBn) |

Fig. 9

NFC DEVICE WITH CONFIGURABLE NOTIFICATIONS

The present invention relates to a near field communication device designed to establish a near field communication channel with an external device, and provide a first host processor of the device with application data sent by the external device.

So-called NFC techniques (Near Field Communication) enable two devices each comprising an antenna coil to exchange data by inductive coupling. The creation of an NFC channel requires that one of the two devices, referred to as "reader", emit a magnetic field, and that the other device, referred to as "card", have its antenna coil sufficiently close to the one of the first device so that the magnetic field generates an antenna signal in the latter. In another known NFC method, referred to as "peer-to-peer" (or point-to-point), each device alternately emits the magnetic field. In recent years, NFC devices have thus been developed that are provided to be connected to host processors and enable them to execute NFC applications in reader, card emulation or peer-to-peer mode.

Figure 1:
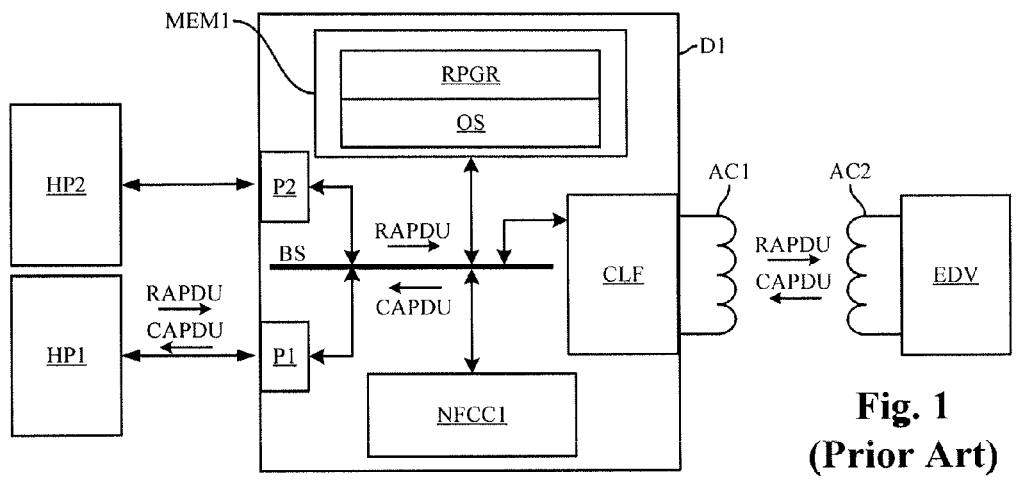

FIG. 1 schematically represents the structure of a conventional NFC device D1 of the above-mentioned type. The device comprises a CLF (Contactless Front End) communication interface circuit, an NFC controller designated NFCC1, a program and data memory MEM1, communication ports P1, P2, these elements being coupled by a bus BS. The ports P1, P2 enable host processors HP1, HP2 to be connected to the device D1. The memory MEM1 receives an operating system OS of the processor NFCC1 and a routing program RPGR executed by the processor NFCC1. The interface circuit CLF is equipped with an antenna coil AC1 and is configured to establish an NFC channel with an external device EDV itself comprising an antenna coil AC2.

Such a near field communication device has been described in the patents or patent applications EP 1 327 222, EP 1 758 049, EP 1 855 229, and EP 1 855 389. EP 1 327 222 teaches providing the card emulation mode. EP 1 855 229 describes a method for electrically powering the device from the magnetic field received when the latter is in the card emulation mode. EP 1 855 389 describes a method for routing incoming data (data received by the interface circuit CLF) whereby the host processor for which the data is intended can be determined. EP 1 327 222 describes a routing method using a routing table. Furthermore, standards or specifications more precisely define certain features of the device, such as the ETSI TS 102 622 standard ("Smart Cards; UICC—Contactless Front-end (CLF) Interface; Host Controller Interface (HCI)"), the ETSI TS 102 613 standard which defines the operation of the CLF interface circuit, or the NCI specifications ("NFC Controller Interface").

It is assumed here that the host processor HP1 is a secure component dedicated to applications requiring a certain level of security, in particular pay-for applications or applications directly or indirectly involving a payment, and that the processor HP2 is a non-secure processor having access to means for communicating with a user. The processor HP1 is for example a UICC-type card (Universal Integrated Circuit Card) equipped with an NFC function or more generally a Secure Element-type processor (secure processor dedicated to NFC applications). The processor HP2 is for example the base-band processor of a mobile telephone, and also controls various man/machine interface peripherals, such as a display and means of input (real or virtual keyboard).

FIG. 1 also represents an example of application in which the device D1 operates in card emulation mode for the host processor HP1, so as to enable the latter to execute a transaction with the external device EDV, for example a point of sale.

During the transaction, the host processor HP1 and the external device EDV exchange application data, for example APDU ("Application Protocol Data Unit") data of the type described by the ISO 7816 standard. More particularly, the external device sends commands CAPDU (designated C-APDU in the standard) and the host processor HP1 sends back responses RAPDU (designated R-APDU in the standard). Such data pass through the device D1, and the controller ensures their routing from the interface circuit CLF to the host processor HP1 or vice versa.

When the transaction is over, the host processor HP1 can provide the processor HP2 with information on the transaction. The processor HP2 can then present such information to the user. For example, the processor HP2 can display a confirmation that a "purchase of product X" transaction was executed on the date Y for an amount Z, possibly together with a sound signal.

Furthermore, the ETSI TS 102 613 standard (version V9.2.0) defines, in its paragraph 11.2, a method enabling two host processors to exchange information on a transaction. This method defines a connectivity gate, a "PRO_HOST_REQUEST" command, and EVT_CONNECTIVITY, EVT_OPERATION_ENDED, EVT_TRANSACTION events. The latter event is formed in the manner indicated below and comprises the "AID" identifier ("Application ID") of the application in question.

| Description | Code | Length in bytes |
|---|---|---|
| AID | '81' | 5 to 16 |
| PARAMETERS | '82' | 0 to 255 |

This communication of information on the conduct of a transaction depends on the configuration of the application program executed by the processor HP1, or of the program which activates an application by means of the above-mentioned connectivity function. The communication to a third processor of information relating to a transaction thus requires providing specific programming lines when designing an application program.

It could thus be desirable to provide a method for communicating information relating to a transaction which does not depend on the application program executed by the host processor, and which can be managed and configured in a centralized manner for all applications, while taking into account the fact that the information to be communicated may be different from one application to another.

Thus, some embodiments of the present invention relate to a near field communication device configured to establish a near field communication channel with an external device, and provide a first host processor with application data sent by the external device, provide a second host processor with notifications relating to the nature or content of application data provided to the first host processor, and configure the notifications according to a characteristic parameter of an application in the framework of which the external device sends data to the first host processor.

According to one embodiment, the device is designed to configure the notifications according to at least one of the following characteristic parameters: an identifier of the application in the framework of which the external device sends data to the first host processor; a technology by means of which the near field communication channel is formed; or a communication protocol by means of which the near field communication channel is formed.

According to one embodiment, the device is designed to provide the second host processor with notifications comprising data present in application data, or an item of information on data present in the application data.

According to one embodiment, the device is configured to provide the second host processor with a notification containing the identifier of the application in the framework of which the external device sends data to the first host processor.

According to one embodiment, the device is configured to: identify an application datum sent by the external device, select a data analysis program according to the result of the datum identification and to the characteristic parameter of the application, analyze the application datum by means of the selected analysis program, and configure a notification according to the result of the datum analysis.

According to one embodiment, the device is configured to identify the application datum by means of a series of identification masks, by comparing each mask with the application datum until a mask corresponding to the datum is found.

According to one embodiment, the device is configured to analyze the application datum by combining the application datum with a data mask forming or included in the selected analysis program.

According to one embodiment, the application data are commands CAPDU within the meaning of the ISO 7816 standard.

According to one embodiment, the device is configured to: provide the external device with application data sent by the first host processor, provide the second host processor with notifications relating to the nature or content of the application data sent by the first host processor, and configure the notifications according to said characteristic parameter.

Some embodiments of the present invention also relate to a near field communication method, comprising steps of: establishing a near field communication channel between an external device and a near field communication device, providing a first host processor of the near field communication device with application data sent by the external device, providing a second host processor of the near field communication device with notifications relating to the nature or content of the application data provided to the first host processor, and configuring the notifications according to a characteristic parameter of an application in the framework of which the external device sends data to the first host processor.

According to one embodiment, the notifications are configured according to at least one of the following characteristic parameters: an identifier of the application in the framework of which the external device sends data to the first host processor, a contactless communication technology by means of which the near field communication channel is formed, or a contactless communication protocol by means of which the near field communication channel is formed.

According to one embodiment, the notifications provided to the second host processor comprise data present in application data, or an item of information on data present in the application data.

According to one embodiment, the method comprises a step of providing the second host processor with a notification containing the identifier of the application in the framework of which the external device sends data to the first host processor, upon receiving an application selection command sent by the external device and provided to the first host processor.

According to one embodiment, the method comprises the steps of: identifying an application datum sent by the external device, selecting a data analysis program according to the result of the datum identification and to the characteristic parameter of the application, analyzing the application datum by means of the selected analysis program, and configuring a notification according to the result of the datum analysis.

According to one embodiment, the method comprises the use of a routing and notification table designating the first host processor and the second host processor according to at least one characteristic parameter of the application.

Figure 2:
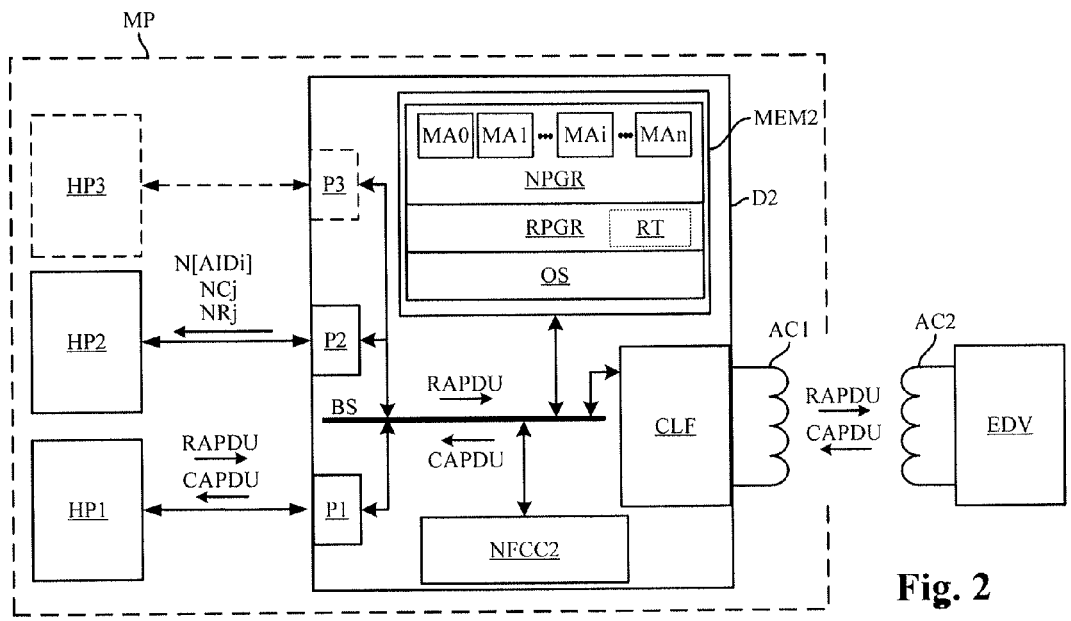
Figure 3:
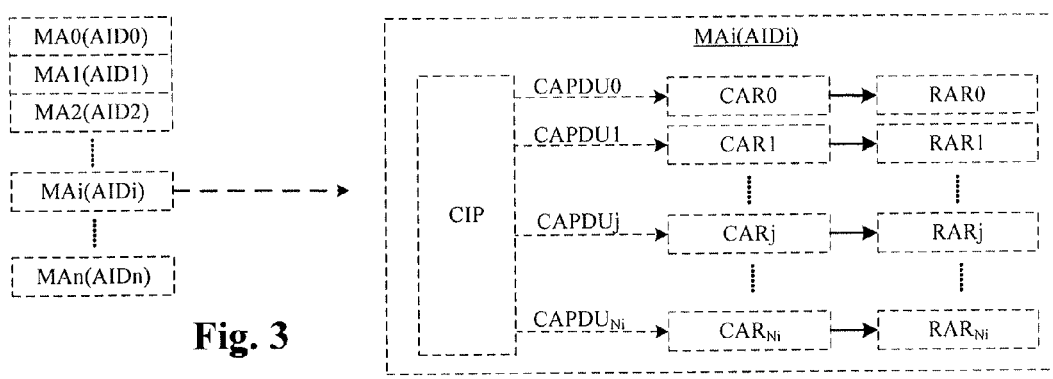
Figure 4A:
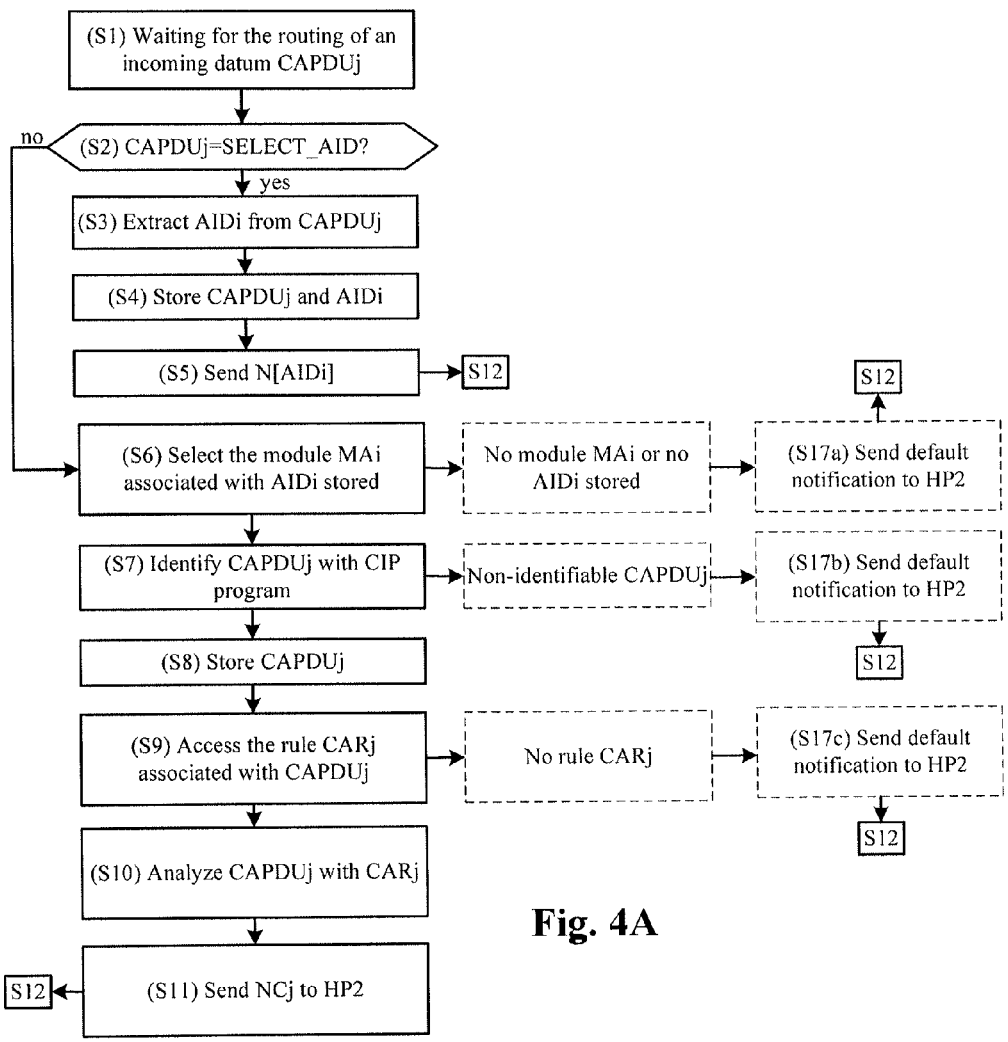
Figure 4B:
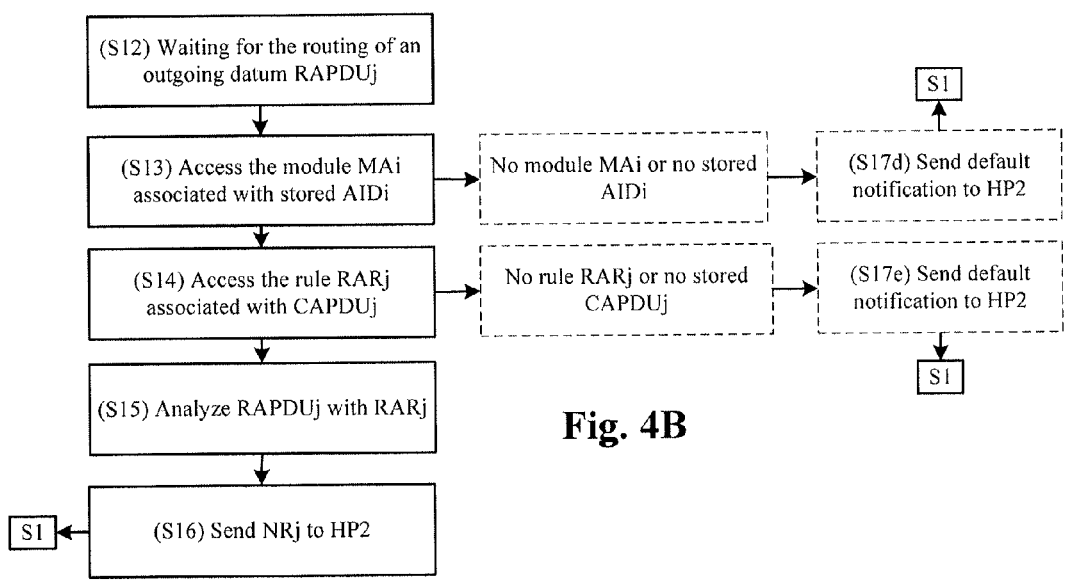

Some embodiments of the present invention will be described below in relation with, but not limited to, the accompanying figures, in which:

FIG. 1 described above schematically shows the hardware and software structure of a conventional NFC device, FIG. 2 schematically shows the hardware and software structure of one embodiment of an NFC device according to the present invention, FIG. 3 shows one embodiment of notification configuration modules according to the present invention, FIGS. 4A, 4B describe steps of a notification method using the modules of FIG. 3, FIG. 5 shows another embodiment of notification configuration modules according to the present invention and one embodiment of a notification table according to the present invention, FIGS. 6A, 6B describe steps of one embodiment of a notification method using the modules of FIG. 5, FIG. 7 shows another embodiment of notification configuration modules according to the present invention, FIG. 8 shows another embodiment of a notification table according to the present invention, and FIG. 9 shows one embodiment of a routing and notification table according to the present invention.

FIG. 2 schematically represents the structure of an NFC device according to the present invention, designated D2. The device D2 has the same general structure as the device D1 previously described, and thus comprises a CLF communication interface circuit ("Contactless Front End"), an NFC controller "NFCC2", a program and data memory MEM2, communication ports P1, P2, these elements being coupled by a bus BS. The ports P1, P2 enable host processors HP1, HP2 to be connected to the device D2. The memory MEM2 receives an operating system OS, a routing program RPGR which can include a routing table RT, and a notification program NPGR according to the present invention. The interface circuit CLF is equipped with an antenna coil AC1 and is configured to establish a near field communication channel with an external device EDV itself comprising an antenna coil AC2. The device D2 and the host processors HP1 HP2 can be arranged in a portable device MP such as a mobile telephone.

When the host processor HP1 and the external device EDV perform a transaction, the controller NFCC2 executes the routing program RPGR and transfers to the host processor HP1 commands CAPDU sent by the external device EDV and received by the interface circuit CLF, or transfers to the interface circuit CLF responses RAPDU sent by the processor HP1, so that they are sent to the external device EDV. The controller also executes the notification program NPGR according to the present invention, and sends the processor HP2 notifications relating to the nature and/or content of the data CAPDU, RAPDU exchanged by the processor HP1 and the external device EDV.

According to one embodiment, the controller sends the processor HP2 the following notifications:

N[AIDi]: application selection notification containing an application identifier AIDi present in an application selection command SELECT_AID transferred to the processor HP1, NCj: notification concerning a command CAPDUj received by the interface circuit CLF and transferred to the processor HP1, NRj: notification concerning a command RAPDUj sent by the processor HP1 and transferred to the interface circuit CLF.

A notification NCj, NRj relating to a command or a response may comprise any type of information or datum, for example:
- information on the nature of the command or of the response (for example the type of command),
- information on the content of the command or of the response (for example the fact that a given datum is present in the command or the response), and/or
- one or more data contained in the command or the response.

The notifications NCj or NRj are generated according to a characteristic parameter of the application in the framework of which the external device EDV and the host processor HP1 exchange the data APDU. In some embodiments described below, this characteristic parameter is the identifier AID of the application.

For this purpose, the notification program NPGR comprises a set of notification configuration modules MAi (MA0, MA1, ... MAn), each module MAi being associated with an identifier AIDi. The structure of the modules MAi is schematically represented on FIG. 3. Each module comprises:
- a command identification program CIP,
- a set of command analysis rules (CAR0, CAR1, ... $CAR_{Ni}$) relating to commands CAPDUj (CAPDU0, CAPDU1, ... $CAPDU_{Ni}$) that the program CIP can enable to be identified, and
- a set of response analysis rules RARj (RAR0, RAR1, ... $RAR_{Ni}$) relating to responses RAPDUj (RAPDU0, RAPDU1, ... $RAPDU_{Ni}$) that the program CIP can enable to be identified.

Each response analysis rule RARj is associated with a command analysis rule CARj, and each command analysis rule CARj is associated with a command CAPDUj which can be identified by means of the program CIP. Each rule CARj enables the controller NFCC2 to generate a notification NCj communicated to the processor HP2. Similarly, each rule RARj enables the controller to generate a notification NRj communicated to the processor HP2.

Thus, the same command CAPDUj or the same response RAPDUj can give rise to different notifications NCj, NRj depending on the application in the framework of which it is sent, due to the fact that the rules CARj, RARj by means of which the notifications are generated may be different.

Furthermore, the identification program CIP associated with an application is not necessarily designed to identify any command and any response that the application is susceptible of using. Only the commands or responses for which a notification is desired can be taken into consideration when designing the program CIP. Furthermore, a command can give rise to a notification NCj without the corresponding response itself giving rise to a notification NRj, or vice-versa.

FIGS. 4A, 4B describe one embodiment of a notification method according to the present invention, implemented by means of the notification program NPGR. It is assumed here that the processor HP1 operates in card emulation mode, such that the incoming application data (data sent by the external device EDV and received by the interface circuit CLF) are commands CAPDU and the outgoing application data (data sent by the host processor HP1) are responses RAPDU.

With reference to FIG. 4A, the method comprises an initial step S1 of waiting for the routing of an incoming datum CAPDUj received by the interface circuit CLF. When this datum is routed to the processor HP1 by the routing program RPGR, the controller NFCC2 goes to a step S2 where it determines whether or not the command CAPDUj is an application selection command "SELECT_AID". If the answer is positive, the controller goes to a step S3, otherwise the controller goes to a step S6.

In step S3, the controller extracts the identifier AIDi from the command CAPDUj. During a step S4, the controller stores the command CAPDUj as current command and the identifier AIDi as current identifier. During a step S5, the controller sends the processor HP2 a notification N[AIDi] containing the identifier AIDi, then goes to a step S12.

Step S6 is executed after step S2 when the incoming datum CAPDUj is not an application selection command. An identifier AIDi is supposed to have been stored as current identifier during a previous step S4, since the command SELECT_AID is the first command sent by the external device EDV at the beginning of an application. Thus, in step S6, the controller selects the notification configuration module MAi associated with the current identifier AIDi, from among all of the modules MA0 to MAn. During a step S7, the controller identifies the command CAPDUj by means of the program CIP present in the module MAi, and stores the command as current command in a step S8. In a step S9, the controller accesses the analysis rule CARj present in the module MAi. In a step S10, the processor analyzes the command CAPDUj with the rule CARj and generates a notification NCj that it sends to the host processor HP2 in a step S11, then goes to step S12.

It will be noted that step S4 of storing the identifier AIDi as current identifier may involve storing the rank "i" of the identifier in a list of identifiers and using an index associating with each rank i a notification configuration module MAi. Similarly, step S8 of storing the command CAPDUj as current command may involve storing the rank j of the command in a list of commands CAPDU0 to $CAPDU_{Ni}$ (list of the commands that the program CIP of the module MAi enables to be identified), the parameter j allowing the analysis rules CARj, RARj applicable to the command CAPDUj to be found.

In step S12, FIG. 4B, the controller waits for an outgoing datum RAPDUj sent by the host processor HP1 to be routed by the routing program RPGR to the interface circuit CLF. This datum is supposed to be the response RAPDUj to the current command CAPDUj. When the outgoing datum is routed, the controller accesses the module MAi associated with the current identifier AIDi during a step S13, then accesses the response analysis rule RARj associated with the current command CAPDUj during a step S14. In a step S15, the controller analyzes the response RAPDUj with the rule RARj and generates a notification NRj that it sends to the host processor HP2 in a step S16. The controller then returns to step S1 while waiting for a new command to be routed to the processor HP1.

The method that has just been described may comprise exceptions preventing the processor NFCC2 from performing certain steps. In this case, provision may be made for default notifications to be sent. For example, if it appears in step S6 that no current identifier AIDi has been previously stored, or that there is no notification configuration module MAi associated with the stored current identifier AIDi, the controller goes to a step S17a where it sends the host processor HP2 a notification relating to this exception, then goes to step S12. This notification indicates for example that no application identifier is associated with a command sent to the processor HP1, or that no notification configuration module is associated with the current identifier. In step S7, if the program CIP does not enable the command CAPDUj to be identified, the controller goes to a step S17b where it sends the processor HP2 a notification relating to this exception, then goes to step S12. Similarly, in step S9, if the current module MAi does not contain any command analysis rule CARj, the controller goes to a step S17c where it sends a notification relating to this exception, then returns to step S12. In step S13, if no current identifier AIDi has been previously stored, or if the controller does not find any module MAi corresponding to the current identifier, the controller goes to a step S17d where it sends the processor HP2 a notification relating to this exception, then returns to step S1. Finally, in step S14, if the controller does not find in the module MAi any response analysis rule RARj associated with the current command CAPDUj, or if no current command CAPDUj has been previously stored, the controller goes to a step S17e where it sends the processor HP2 a notification relating to this exception, then returns to step S1.

In one alternative embodiment of this method, the steps of waiting S1 for the routing of an incoming datum and of waiting S12 for the routing of an outgoing datum are simultaneously executed so that the controller can notify the processor HP2 of the routing of two successive commands without the processor HP1 having sent any response to the first command (no outgoing datum). Furthermore it will be noted that, if a second command is received after a first command, without a response to the first command having been sent by the processor HP1, the response sent by the latter after receiving the second command is considered to be a response to the second command and not to the first, as regards its processing to send a notification to the processor HP2.

FIG. 5 shows one embodiment of notification configuration modules MBi (MB0 to MBn) which replace the modules MAi described above. Each module MBi comprises 3 columns and Ni+1 lines (number of lines which can vary from one module to another). Each line comprises: in the first column, a command identification mask IMj, in the second column an analysis rule CARj and in the third column an analysis rule RARj. The masks IMj are strings of bits provided for being combined bit by bit by means of the Exclusive OR function with commands CAPDU to be identified. According to one embodiment, each mask IMj is accompanied by a value mask intended to be applied to the commands by means of the AND function to remove therefrom non-significant bits or bits that cannot be identified with a mask (unpredictable value bits), before combining the result ("clean" command) with the mask IMj by means of the Exclusive OR function. If the result of the combination of each bit of a command identification mask IMj with the corresponding bits of a command is equal to 0, the command is deemed to be identified by means of this mask and the analysis rules CARj, RARj are read in the line comprising the mask IMj. In another embodiment, the identification of the commands could be ensured by a configurable hard-wired logic function ensuring a combined function of value mask and identification mask.

As shown in FIG. 5, a notification table AT1 is also provided to associate with each application identifier AIDi a module MAi. The table AT1 comprises a first column containing identifiers AIDi or ranks i of identifier, and a second column containing values A(MBi) (A(MB0), A(MB1) . . . A(MB$_n$)) which designate the modules MBi associated with the identifiers AIDi. These values may be the addresses in the memory MEM2 of the modules MBi, or indexed addresses of these modules, for example the rank of the module in an address index. The notification table AT1 thus forms a look-up table between the application identifiers and the corresponding notification configuration modules.

Furthermore, a command analysis rule CARj may comprise a data mask DMj or a command analysis program more complex than a data mask. Indeed, certain known commands have data fields of fixed size located at fixed locations, which can be extracted by means of a data mask. Thus, when a rule CARj comprises a data mask DMj, the mask is combined with the command by means of the AND logic function, and the result of the combination is the data to be notified to the processor HP2. Other known commands have however variable position and length fields, for example commands in the TLV ("Type Length Value") format. It is then necessary to locate in such commands tags enabling a value searched for to be found, which requires providing an analysis program that is more sophisticated than a simple data mask.

However, it is assumed here that data masks cannot be used in the response analysis rules RARj, due to the variable structure of the responses RAPDU as provided by the ISO 7816 standard, generally in the TLV or LV format, requiring an analysis program.

FIGS. 6A, 6B represent one embodiment of a notification method using the notification configuration modules MBi and the notification table AT1. The method comprises the following steps:

step S20 (FIG. 6A): the controller waits for an incoming datum CAPDUj to be routed by the routing program, then goes to step S21, step S21: by means of the Exclusive OR function (XOR), the controller combines the command CAPDUj with a mask MAID1 dedicated to identifying the command SELECT_AID (see example in Appendix 2). If the result is equal to 0, the command is an identifier selection command and the controller goes to step S22, otherwise the controller goes to step S25, step S22: by means of the AND logic function, the controller combines the command CAPDUj with a mask MAID2 dedicated to extracting the identifier AIDi, which forms the result of the operation (see example in Appendix 2), step S23: the controller stores the mask MAID1 as current mask and the identifier AIDi as current identifier, or the rank "i" of the identifier, step S24: the controller sends the processor HP2 a notification N[AIDi] containing the identifier AIDi, then goes to step S32, step S25: by means of the notification table AT1, the controller selects the notification configuration module MBi corresponding to the current identifier AIDi, step S26: the controller reads in the module MAi the first command identification mask IM0, or the next mask IM if a mask has already been read during a previous step S26, step S27: the controller combines the command CAPDUj with the mask IM by means of the Exclusive OR function, possibly after having applied the value mask to it; if the result is a string of bits equal to 0, the controller goes to step S28, otherwise it returns to step S26 to read the next mask, step S28: the controller stores the mask IM as current mask IMj, or only stores the rank "j" of the mask, step S29: the controller reads in the module MAi the analysis rule CARj associated with the mask IMj. If the rule CARj comprises a data mask DMj, the controller goes to step S30a; if the rule comprises an analysis program, the controller goes to step S30b, step S30a: the controller combines the mask DMj with the command CAPDUj by means of the AND logic function to extract from the command data to be notified, step S30b: the controller analyzes the command CAPDUj by means of the rule CARj to obtain an item of information to be notified, which can include data extracted from the command, step S31: the controller sends the processor HP2 the notification NCj containing the data and/or the information, then goes to step S32, step S32 (FIG. 6B): the controller waits for an outgoing datum RAPDUj to be routed to the interface circuit CLF. As indicated previously, the controller could simultaneously wait for a second command to be routed, step S20, to cover the case in which two simultaneous commands are received, step S33: the controller reads, in the current module MBi, the rule RARj associated with the current mask IMj or with the mask MAID1, step S34: the controller analyzes the response RAPDUj with the rule RARj (see example in Appendix 2), and generates a response notification which can include or consist of data present in the response, step S35: the controller sends a notification NRj containing such information to the processor HP2.

As above, this method may comprise all or part of the following execution exceptions:

in step S25, if no current identifier AIDi has been previously stored or if no module MBi is associated with the current identifier, the controller goes to a step S36a where it sends the processor HP2 a notification relating to this exception, then goes to step S32, in step S26, if none of the masks IM0 to $IM_{Ni}$ of the module MBi corresponds to the current command CAPDUj, the controller goes to a step S36b where it sends the processor HP2 a notification indicating that the command has not been identified, then goes to step S32, in step S33, if the controller does not find any current identifier AIDi, it goes to a step S36c where it sends the processor HP2 a default notification indicating that a non-identifiable datum that is not linked to any known application has been sent by the processor HP1. If the controller does not find any module MBi associated with the current identifier AIDi, it goes to a step S36d where it sends the processor HP2 a default notification indicating that a non-identifiable datum linked to the identifier application AIDi has been sent by the processor HP1. Finally, if the controller does not find any analysis rule RARj associated with the current identifier AIDi and with the stored current mask IMj, it goes to a step S36e where it sends the processor HP2 a default notification indicating that a non-identifiable response has been sent by the processor HP1.

FIG. 7 shows another embodiment of notification configuration modules MCi according to the present invention. The identification program CIP is common to all the modules MCi and each module MCi only comprises analysis rules CARj, RARj. In this embodiment, the modules MCi are no longer necessary as individually-selectable elements. The notification program can directly access pairs NRi, j of analysis rules CARj, RARj from the current identifier AIDi and from the current command CAPDUj.

Examples of notification methods have been described above that are applied to a device D2 linked to two host processors HP1, HP2, in the case in which only the host processor HP2 receives notifications concerning the data routed to the processor HP1 or sent by the latter. In practice, the device may comprise three host processors or more, and each processor is susceptible of receiving notifications in connection with the activity of the other host processors. A notification method according to the present invention can therefore also be configured to generate multiple notifications.

Similarly, it has been supposed above that only one application at a time can be managed by the host processor HP1, such that the notifications sent to the host processor HP2 are attached to the same application identifier, referred to as "current identifier". According to one embodiment, the processor HP1 and the external device EDV can conduct several applications at the same time. In this case, the data exchanged in the framework of an application are distinguished from the ones exchanged in the framework of another application by means of logic channels. Thus, the ISO 7816 standard provides the possibility of using 4 to 20 logic channels by parameterizing the bits 0 and 1 of the first byte CLASS of the commands or responses (the default value of which is 0 in the event that only one application is executed at a time). The "Global Platform" specifications provide 4 additional bits that define 16 logic channels in addition to the 4 logic channels provided for by the ISO 7816 standard, i.e. 20 channels in total.

In this case, the storing of the application identifier is not sufficient to select the analysis rules applicable to the commands and responses routed by the device D2. Indeed the identifier AIDi is present in the command SELECT_AID but is not included in the next commands or responses. A notification method according to the present invention uses in this case a notification table AT2 of the type represented in FIG. 8, which comprises a "logic channel" column in addition to the column containing the identifiers AID0 to AIDn (or their rank i) and to the column containing the addresses A(MBi) of the notification configuration modules MBi. The "logic channel" column is initially empty and is dynamically updated when commands SELECT_AID containing logic channel numbers are received and routed to a host processor.

The steps of the method represented in FIG. 6A are then modified as follows:

in step S23, when the identifier AIDi has been extracted from the first command SELECT_AID received, the corresponding logic channel is recorded in the notification table AT2 in connection with this identifier. Assuming that this identifier is "AID0" and that the logic channel number chosen by the external device is "CH01", the channel CH01 is associated with this identifier in the notification table AT2, as shown on FIG. 8.

during another iteration of step S23, when another identifier is extracted from another command SELECT_AID, for example the identifier "AID2", and assuming as an example that the logic channel number "CH02" is found in the command, this logic channel number CH02 is associated with the identifier AID2 in the notification table AT2.

then, when step S25 is executed, the logic channel number present in the command received is used as input point of the notification table AT2, to determine which module, MA0 or MA2, must be selected. It is not therefore necessary, in this embodiment, to store the identifier AIDi in step S23. It is rather the identity (address in memory or indexed address) of the modules MA0, MA2 associated with each logic channel in which a command can be received that is stored.

Some embodiments of the routing method according to the present invention have been described above in which the characteristic parameter selected to configure the notifications is the identifier AIDi of the application or a logic channel associated with this identifier.

In other embodiments of the routing method according to the present invention, other characteristic parameters of an application can be used to configure the notifications. In particular, these parameters may be those that are used by the routing program RPGR to determine the host processor forming the destination point of the incoming data. In such a case, it is then possible to merge the routing table RT used by the routing program RPGR and the notification table used by the notification program NPGR to obtain a routing and notification table RNT which replaces a conventional routing table RT.

A schematic example of a routing and notification table RNT is described by Table 1 in Appendix 1 and is represented in FIG. 9. The table RNT is here designed in connection with the NCI specifications of the NFC Forum (TC DEV NCI 00058R013 NFCForum TS NCI 1.0).

The NCI specifications, paragraph 5.3, recommend, when an NFC device is in the "listen" mode, a routing method based on three parameters:
- the application identifier AID,
- the protocol, if the identifier AID cannot be found,
- the technology, if the protocol cannot be determined.

The "protocol" and "technology" parameters are defined in the "DIGITAL 1.0" specifications of the NFC Forum. The protocol may be "Type1Tag", "Type2Tag", "Type3Tag", "Type4ATag", "Type4B", "ISO-DEP", "NFC-DEP". The technology may be "Type A", "Type B", or "Type F", all using the carrier frequency of 13.56 MHz, or any other so-called "owner" protocol, for example ISO15. A technology is defined by the NCI specifications as a group of transmission parameters such as the RF carrier, the communication mode, the bit rate, the modulation scheme, the bit-level coding, the frame format, the protocol, etc.

The routing and notification table RNT thus comprises the following characteristic parameters to configure the routing and the notifications:
- AID: the application identifier,
- "PROT": "protocol" within the meaning of the NCI specifications,
- "TECH": "technology" within the meaning of the NCI specifications.
- "BAT": state of the battery of the device D2 (not represented on FIG. 2).

The identifier AID is found in the command SELECT_AID as described above (step S3 or S22). However, the identifier AID is here detected by the routing program RPGR for purposes of routing the incoming data and such detection thus does not need to be performed again by the notification program. A simplification of the notification program can therefore be provided. Generally speaking, the notification program and the routing program can be merged in the framework of management of the routing and of the notifications based on the same characteristic parameters of the application. The protocol is detected during a so-called "Discovery" step provided in the NCI specifications. The technology is also detected during the "Discovery" step. More precisely, in a chapter entitled "Activity", the specifications provide the following steps: 1—Technology detection; 2—Collision processing (optional); 3—Activation of the device; 4—Data exchange; 5—Deactivation of the device. The technology is identified in step 1 and the protocol in steps 1 and 3.

The state of the battery may be "ON" (battery having a satisfactory charge level), "LOW" (level below a threshold), or "OFF" (empty battery or battery having a charge insufficient for certain units of the device to function). The device D2 can have an operating mode with the battery empty, by taking energy from the magnetic field emitted by the external device EDV, as described in EP 1 855 229. In one alternative, combinations between the state of the battery and the state of the host processor ("ON" for activated and "OFF" for deactivated) could be taken into account. An additional column relating to the state of the host processor should then be provided.

Furthermore, the routing and notification table RNT comprises the following variables, that vary according to the characteristic parameters AID, PROT, TECH, BAT:
- TargProc1: designates the target processor for the routing of the incoming data. It is assumed here that the device D2 is coupled to three host processors HP1, HP2, HP3, the processor HP3 being represented in dotted lines on FIG. 2 and connected to a port P3,
- TargProc2: designates the target processor for sending the notifications according to the present invention.
- A(MB): this column contains the values A(MB0), A(MB1) . . . A(MB$_n$) described above, which designate the modules MBi whereby it is possible to configure the notifications sent to the processor TargProc2.

The NCI specifications provide that the identity of the target processor (here "TargProc1") be determined from the identifier AID if the latter is known, or from the protocol if the identifier is not known (certain NFC applications use no identifier AID), or even from the technology if the identifier AID and the protocol cannot be determined.

The routing as shown by the Table RNT thus considers the three possibilities: known identifier AID, unknown identifier but known protocol, identifier and protocol unknown but known technology. The designations "PROT0", "PROT2", "PROT4", "TECH1", "TECH2" contained in the table RNT are schematic and each correspond to one of the above-mentioned protocols or technologies, or any other applicable technology or protocol.

This architecture of routing and notification table shows that the rules for determining the target processor TargProc1 for the routing of the incoming data may also be used to determine the processor to which notifications are sent, and the notification configuration module to be used to configure these notifications.

According to one embodiment not represented, the routing and notification table RNT comprises a column "TargProc3" designating a second processor receiving notifications. It may then comprise a second column "MB" to designate the notification configuration modules that can be used to generate the notifications sent to the processor designated by the column "TargProc3". In this case, the notifications can be configured differently according to the processor to which they are sent.

Appendix 1

Forming an Integral Part of the Description

TABLE 1

(routing and notification table RNT)

| AID | PROT | TECH | BAT | TargProc1 | TargProc2 | A(MB) |
|---|---|---|---|---|---|---|
| AID0 | — | — | ON | HP1 | HP2 | A(MB0) |
| — | PROT0 | — | ON | HP1 | HP2 | A(MB0) |
| — | — | TECH2 | ON | HP1 | HP2 | A(MB0) |

TABLE 1-continued (routing and notification table RNT)

| AID | PROT | TECH | BAT | TargProc1 | TargProc2 | A(MB) |
|---|---|---|---|---|---|---|
| AID0 | — | — | LOW | HP1 | HP2 | A(MB1) |
| — | PROT0 | — | LOW | — | HP2 | A(MB1) |
| — | — | TECH2 | LOW | — | HP2 | A(MB1) |

TABLE 1-continued (routing and notification table RNT)

| AID | PROT | TECH | BAT | TargProc1 | TargProc2 | A(MB) |
|---|---|---|---|---|---|---|
| AID0 | — | — | OFF | HP1 | — | — |
| — | PROT0 | — | OFF | HP1 | — | — |
| — | — | TECH2 | OFF | HP1 | — | — |
| AID1 | — | — | ON | HP2 | HP1 | A(MB2) |
| — | PROT2 | — | ON | HP2 | HP1 | A(MB2) |
| — | — | TECH1 | ON | HP2 | HP1 | A(MB2) |
| AID1 | — | — | LOW | HP2 | HP1 | A(MB2) |
| — | PROT2 | — | LOW | HP2 | HP1 | A(MB2) |
| — | — | TECH1 | LOW | HP2 | HP1 | A(MB2) |
| AID1 | — | — | OFF | HP1 | HP3 | — |
| — | PROT2 | — | OFF | HP1 | HP3 | — |
| — | — | TECH1 | OFF | HP1 | HP3 | — |
| ... | ... | ... | ... | ... | ... | ... |
| AIDn | — | — | ON | HP1 | HP2 | A(MBn) |
| — | PROT4 | — | ON | HP1 | HP2 | A(MBn) |
| — | — | TECH2 | ON | HP1 | HP2 | A(MBn) |

Appendix 2

Forming an Integral Part of the Description

1—Example of Identification Mask for Identifying the Command SELECT-AID:
1.1—Format of the Command SELECT_AID

| CLA | INS | P1 | P2 | Lc | Inf | Le |
|---|---|---|---|---|---|---|
| 00 | A4 | 04 | 00 | xx | AID | 00 |

(hexadecimal notation)

Identification of the command:
1.2—Value Mask VM

| CLA | INS | P1 | P2 | Lc | AID |
|---|---|---|---|---|---|
| 0000 | 1010 | 0000 | 0000 | n/a | n/a |
| 0000 | 0100 | 0100 | 0000 | | |

(binary notation)

1.3—Identification Mask IM

| CLA | INS | P1 | P2 | Lc | AID |
|---|---|---|---|---|---|
| 1011 | 1111 | 1111 | 1111 | n/a | n/a |
| 0000 | 1111 | 1111 | 1101 | | |

(binary notation)

1.4—Operation to be Conducted by Means of the Masks
Match1=[Command to be analyzed] XOR VM (XOR=Exclusive OR)
Match2=Match1 AND IM (AND=AND function)
If Match2=00 00 00 00 . . . (Hexadecimal), the command is identified.
2—Example of Mask for Extracting the Identifier AID of the Command SELECT-AID
2.1—Example of Command

| CLA | INS | P1 | P2 | Lc | Da0 | Da1 | Da2 | Da3 | Da4 | Da5 | Da6 | Le |
|---|---|---|---|---|---|---|---|---|---|---|---|---|
| 00 | A4 | 04 | 00 | 07 | A0 | 00 | 00 | 00 | 03 | 10 | 10 | 00 |

(hexadecimal notation)

2.2—Example of Mask
The parameter Lc designates the number of bytes present in the data field of a command APDU. In this example, the mask is calculated with a parameter Lc=0.

| CLA | INS | P1 | P2 | Lc | D0 | D1 | D2 | D3 | D4 | D5 | D6 | Le |
|---|---|---|---|---|---|---|---|---|---|---|---|---|
| B0 | B1 | B2 | B3 | B4 | B5 | B6 | B7 | B8 | B9 | B10 | B11 | B12 |
| 00 | 00 | 00 | 00 | 00 | FF | FF | FF | FF | FF | FF | FF | 00 |

(hexadecimal notation)

Bx=Byte of rank x of the command
00=Byte not to be used
FF=Byte to be used
2.3—Extracting the Identifier
AID_TEMP=[Command to be analyzed] AND Mask
AID=Byte B5 up to byte B(5+Lc−1)
AID=Byte B5 up to byte B11
3—Example of Identification Mask for Identifying a Command CAPDUj
3.1 Example of Command
"READ RECORD" command (MasterCard/PayPass transaction command). General format of the command:

| Field | Field values | Description |
|---|---|---|
| CLA | 00 | Class byte which can be equal to 00 for payment applications |
| INS | B2 | Command = READ RECORD |
| P1 | 01 | P1 ("Record number") |
| P2 | xxxx x100 | P2 ("Reference Control Parameter") |
| Le | 00 | Response length |

The field P2 above is expressed in binary, the others in hexadecimal notation. The bits of value "x" are bits of variable value.

Such a command requires a different mask for each field P1 ("Record Number") because each READ RECORD command with a field P1 calls a different response. The number of masks depends on the number of data to be extracted and to be notified to the host processor. In this example, the masks could be as follows:
3.2 Example of Value and Identification Mask

| CLA | INS | P1 | P2 | Lc | Inf | Le |
|---|---|---|---|---|---|---|
| 0000 0000 | 1011 0010 | 0000 0001 | xxxx x100 | 0000 0000 | | |

(binary notation)

This mask is both a value mask (bits "x": bits to be ignored) and an identification mask (bits on 0 or 1). It can be broken down into a value mask in which the bits "x" are equal to 0 and all the other values to 1, which is combined with the command to be analyzed by means of the AND function, and into an identification mask where all the bits "x" are replaced with 0, while keeping the other bits, to be combined with the result of the combination with the value mask by means of the Exclusive OR function.

4—Example of Analysis Program for Analyzing a Response (Analysis Rule RARj)

Example of Response:

| Values | Comment | |
|---|---|---|
| 70 | Tag = Record Template | |
| 7F | Length = 127 | |
| 9F 6C | Value | Tag = App. Version Nr. |
| 02 | | Length = 2 |
| 00 01 | | Value |
| 56 | | Tag = Track1 Data |
| 3E | | Length = 62 |
| 42 | | Value  Format Code |
| 35 34 31 33 31 32 33 34 35 | | PAN |
| 36 37 38 34 38 30 30 | | (=5413123456784800) |
| 5E | | field separator |
| 53 55 50 50 4C 49 45 44 2F 4E 4F 54 | | Name of the holder |
| 5E | | field separator |
| 30 39 30 36 | | Expiry date (YYMM) |
| 31 30 31 | | Service code |
| 33 33 30 30 30 33 33 33 | | other data |
| 30 30 30 32 32 32 32 32 | | |
| 30 30 30 31 31 31 31 30 | | |
| 9F 64 | | Tag = Track1 ATC Digit Nr. |
| 01 | | Length = 1 |
| 03 | | Value |
| 9F 62 | | Tag = Track1 BitMap for CVC3 |
| 06 | | Length = 6 |
| 00 00 00 38 00 00 | | Value |
| 9F 63 | | Tag = Track1 BitMap for UN & ATC |
| 06 | | Length = 6 |
| 00 00 00 00 E0 E0 | | Value |
| 9F 65 | | Tag = Track2 BitMap for CVC3 |
| 02 | | Length = 2 |
| 00 0E | | Value |
| 9F 66 | | Tag = Track2 BitMap for UN$^2$ & ATC |
| 02 | | Length = 2 |
| 0E 70 | | Value |
| 9F 6B | | Tag = Track2 Data |
| 13 | | Length = 19 |
| 54 13 12 34 56 78 48 00 D0 90 61 01 90 00 99 00 00 00 0F | | Value |
| 9F 67 | | Tag = Track2 ATC Digit Nr. |
| 01 | | Length = 1 |
| 03 | | Value |
| 90 00 | SW1-SW2 | |

The response is in TLV format (Type-Length-Value). To analyze its content, tags must be located that enable the values searched for to be found.

Example of Analysis Program for the Search of the "Name of the Holder" Field:

The program must perform the following steps:
Check that SW1–SW2='9000'
Locate tag '70' at the beginning of the response
Locate tag '56' in the value of the tag '70'
The value is in the "Track 1 data" field which contains the name in a specific format (here no TLV format but field separators for historical reasons relating to the magnetic-strip card). In this example, "Track 1 data" can be sent as such to the host processor receiving the notification because an analysis to extract the name would be too specific in the framework of a notification, as the host processor receiving the notification can do it.

The invention claimed is:

1. An apparatus for near field communication (NFC), the apparatus comprising:
a first host processor;
a second host processor; and
a near field communication (NFC) controller coupled with the first host processor and the second host processor, the NFC controller being configured to:
establish a NFC channel with an external device;
provide the first host processor with first application data that is sent by the external device in correspondence with a first application;
provide the second host processor with a first notification that is based on a parameter associated with the first application and the first application data;
provide the first host processor with second application data that is sent by the external device in correspondence with a second application; and
provide the second host processor with a second notification that is based on a parameter associated with the second application and the second application data.

2. The apparatus of claim 1, wherein the parameter associated with the first application includes at least one of:
an identifier of the first application;
a technology of an NFC channel associated with the first application; and
a communication protocol used in the NFC channel associated with the first application.

3. The apparatus of claim 1, wherein the parameter associated with the second application includes at least one of:
an identifier of the second application;
a technology of an NFC channel associated with the second application; and
a communication protocol used in the NFC channel associated with the second application.

4. The apparatus of claim 1, the NFC controller being further configured to provide the second host processor with at least one of:
a notification including data present in the first application data;
an item of information corresponding with data present in the first application data;
a notification including data present in the second application data; and
an item of information corresponding with data present in the second application data.

5. The apparatus of claim 1, wherein:
the first notification includes an identifier of the first application; and
the second notification includes an identifier of the second application.

6. The apparatus of claim 1, the NFC controller being further configured, for the first application data, to:
determine an identifier of the first application data;
select a data analysis program based on the identifier of the first application data and the parameter associated with the first application;
analyze the first application data using the selected data analysis program; and
configure the first notification based on a result of the analysis.

7. The apparatus of claim 6, wherein the NFC controller is further configured to identify the first application data based a series of identification masks, including comparing each identification mask of the series of identifications masks with the first application data until an identification mask corresponding to the first application data is identified.

8. The apparatus of claim 6, wherein the NFC controller is further configured to analyze the first application data by combining the first application data with a data mask corresponding with the selected data analysis program.

9. The apparatus of claim 1, the NFC controller being further configured, for the second application data, to:
determine an identifier of the second application data;
select a data analysis program based on the identifier of the second application data and the parameter associated with the second application;
analyze the second application data using the selected data analysis program; and
configure the second notification based on a result of the analysis.

10. The apparatus of claim 9, wherein the NFC controller is configured to identify the second application data based a series of identification masks, including comparing each identification mask of the series of identifications masks with the second application data until an identification mask corresponding to the second application data is identified.

11. The apparatus of claim 9, wherein the NFC controller is further configured to analyze the second application data by combining the second application data with a data mask corresponding with the selected data analysis program.

12. The apparatus of claim 1, wherein the first application data and the second application data are respective commands of the ISO 7816 standard.

13. A method for near field communication (NFC), the method comprising:
establishing a first NFC channel between a first external device and a NFC device;
receiving, at the NFC device from the first external device; first application data in correspondence with a first application of the first external device;
providing a first host processor of the NFC device with the first application data;
providing a second host processor of the NFC device with a first notification, the first notification being based on a parameter associated with the first application and the first application data;
establishing a second NFC channel between a second external device and the NFC device;
receiving, at the NFC device from the second external device; second application data in correspondence with a second application of the second external device;
providing the first host processor of the NFC device with the second application data; and
providing a second host processor of the NFC device with a second notification, the second notification being based on a parameter associated with the second application and the second application data.

14. The method of claim 13, wherein the parameter associated with the first application includes at least one of:
an identifier of the first application;
a contactless communication technology of the first NFC channel; and
a contactless communication protocol of the first NFC channel.

15. The method of claim 13, wherein the parameter associated with the second application includes at least one of:
an identifier of the second application;
a contactless communication technology of the second NFC channel; and
a contactless communication protocol of the second NFC channel.

16. The method of claim 13, wherein:
the first notification includes at least one of:
data present in the first application data; and
an item of information corresponding with data present in the first application data; and
the second notification includes at least one of:
a notification including data present in the second application data; and
an item of information corresponding with data present in the second application data.

17. The method of claim 13, further comprising providing the second host processor with a third notification containing an identifier of the first application upon receiving an application selection command sent by the first external device that is provided to the first host processor.

18. The method of claim 13, further comprising:
determining an identifier of the first application data;
selecting a data analysis program based on the identifier of the first application data and the parameter associated with the first application;
analyzing the first application data using the selected data analysis program; and
configuring the first notification based on a result of the analysis.

19. The method of claim 13, further comprising:
determining an identifier of the second application data;
selecting a data analysis program based on the identifier of the second application data and the parameter associated with the second application;
analyzing the second application data using the selected data analysis program; and
configuring the second notification based on a result of the analysis.

20. The method of claim 13, wherein the first application data, the first notification, the second application data and the second notification are provided to the first host processor and the second host processor in accordance with a routing and notification table in included in the NFC device.

* * * * *